United States Patent [19]
Cellini et al.

[11] Patent Number: 4,770,748
[45] Date of Patent: Sep. 13, 1988

[54] VACUUM DISTILLATION SYSTEM

[75] Inventors: John V. Cellini; Mario F. Ronghi; James G. Geren, all of West Springfield, Mass.

[73] Assignee: Roncell, Inc., Westfield, Mass.

[21] Appl. No.: 18,336

[22] Filed: Feb. 24, 1987

[51] Int. Cl.$^4$ .............................................. B01D 3/10
[52] U.S. Cl. .............................. 202/185.1; 202/185.6; 202/197; 202/202; 202/205; 202/235; 202/267.1; 55/257.2; 159/31; 203/11; 203/26; 203/DIG. 4; 203/86
[58] Field of Search ............ 202/197, 202, 205, 185.6, 202/182, 185.1, 235, 267; 203/11, 40, DIG. 4, DIG. 17, 26, 91, 86; 55/257 R, 257 PV, 257 QV, 257 NP, 257 PP, 257 C; 122/488–492; 159/31

[56] References Cited

U.S. PATENT DOCUMENTS

| | | | |
|---|---|---|---|
| 191,163 | 5/1877 | Matthiessen | 122/491 |
| 291,462 | 1/1884 | Alderman | 202/185.2 |
| 596,753 | 1/1898 | Kenevel | 202/197 |
| 630,023 | 8/1899 | Baker | 122/492 |
| 1,199,147 | 9/1916 | Baldwin | 202/185.2 |
| 1,416,215 | 5/1922 | Kirkup | 159/31 |
| 2,201,961 | 5/1940 | Stoltz | 202/197 |
| 3,174,623 | 3/1986 | Sloan | 210/285 |
| 3,234,109 | 2/1966 | Lustenader | 203/11 |
| 3,248,305 | 4/1966 | Williamson | 202/180 |
| 3,312,600 | 4/1967 | Morton | 202/160 |
| 3,382,157 | 5/1968 | Barnstead | 202/197 |
| 3,558,436 | 1/1971 | Foley et al. | 202/196 |
| 3,694,321 | 9/1972 | Marovich et al. | 202/197 |
| 3,699,007 | 10/1972 | Picek et al. | 203/40 |
| 3,736,234 | 5/1973 | Miyamoto | 202/185.1 |
| 3,803,001 | 4/1974 | Carnavos | 202/202 |
| 3,975,241 | 8/1976 | Smith | 202/202 |
| 4,390,396 | 6/1983 | Koblenzer | 202/166 |
| 4,406,748 | 9/1983 | Hoffman | 202/233 |
| 4,409,064 | 10/1983 | Vora et al. | 159/47.1 |
| 4,482,431 | 11/1984 | Voorhees | 202/176 |
| 4,536,258 | 8/1985 | Huhta-Koivisto | 202/180 |
| 4,556,457 | 12/1985 | McCord | 202/206 |
| 4,584,061 | 4/1986 | Shelton | 202/185.6 |

FOREIGN PATENT DOCUMENTS 105478 7/1924 Switzerland ..................... 202/202

*Primary Examiner*—Wilbur Bascomb
*Attorney, Agent, or Firm*—Donald S. Holland

[57] ABSTRACT

An improved vacuum distillation system is disclosed for purifying contaminated liquids, such as seawater, brackish water and chemical effluents. In the preferred embodiment, the system includes a vertical separation chamber in which contaminated liquid (e.g., impure water) is boiled and evaporated at a low temperature due to a low pressure created by a vacuum pump; a stack of fan-shaped baffles in the top of the separation chamber that provide a tortuous path for the "distillate vapor", wherein the baffles have downturned lips that trap particulates to prevent them from escaping the separation chamber; a product chamber to which the vapor flows to be condensed; a refrigeration unit having its "cold" coil located inside the product chamber to condense the vapor into pure liquid, wherein the same unit has its "hot" coil located inside the separation chamber to help boil the contaminated liquid; and a funnel underlying the "cold" coil to catch the condensate dripping from it, wherein the funnel guides the product water into a collection area below it and acts as a shield to prevent re-evaporation of the collected water.

8 Claims, 3 Drawing Sheets

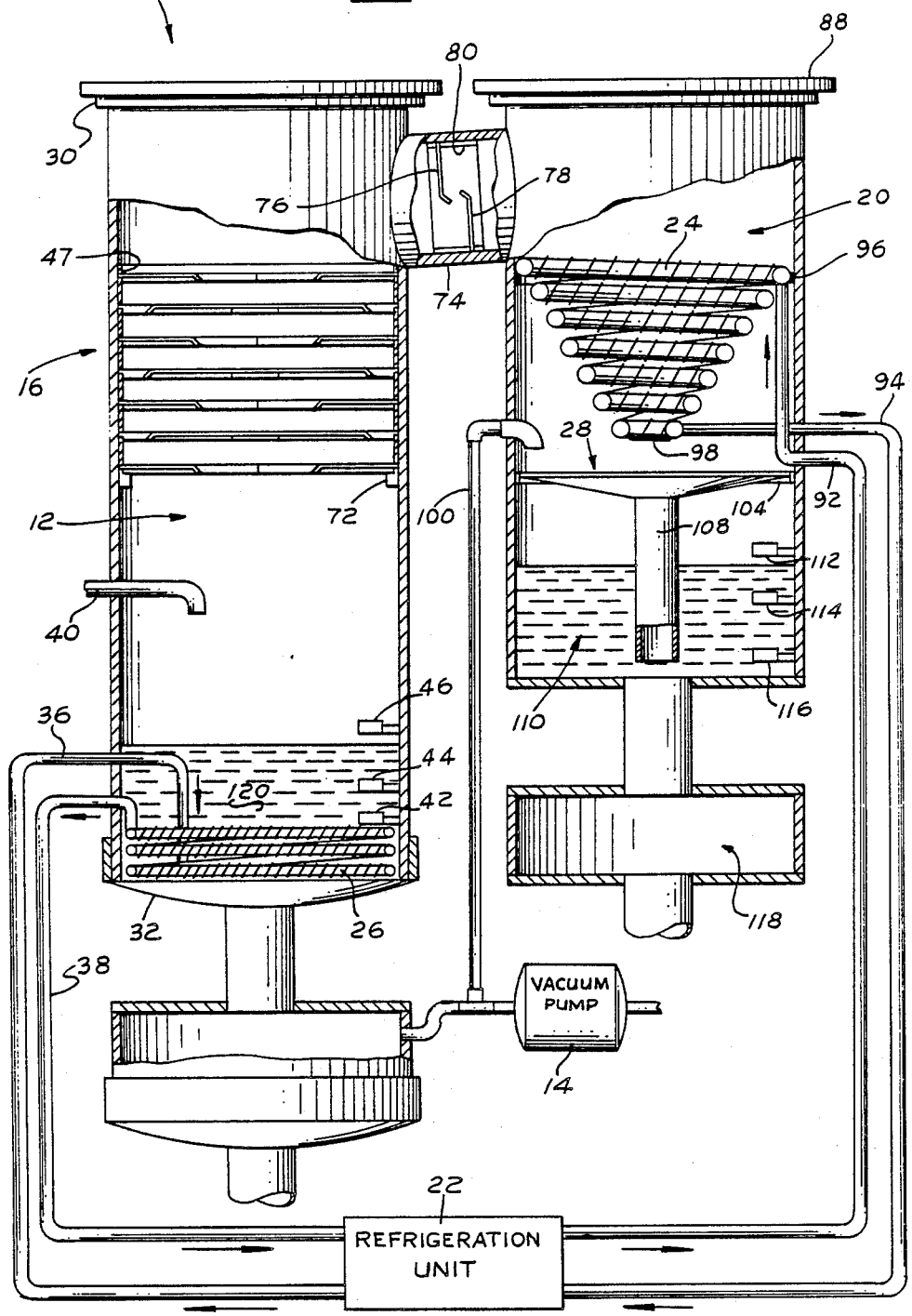

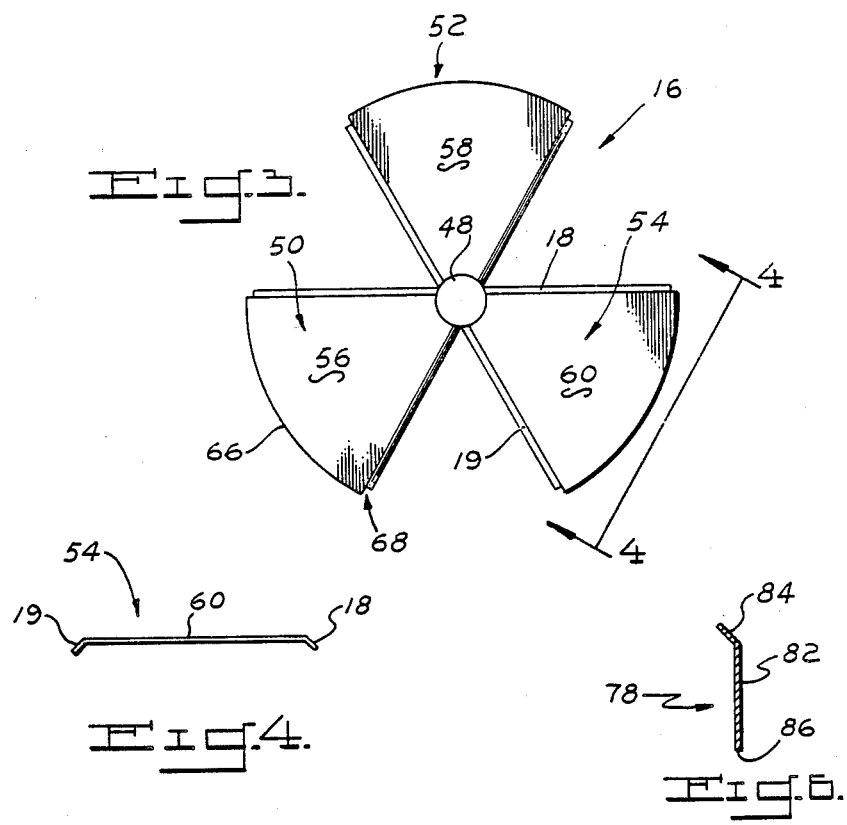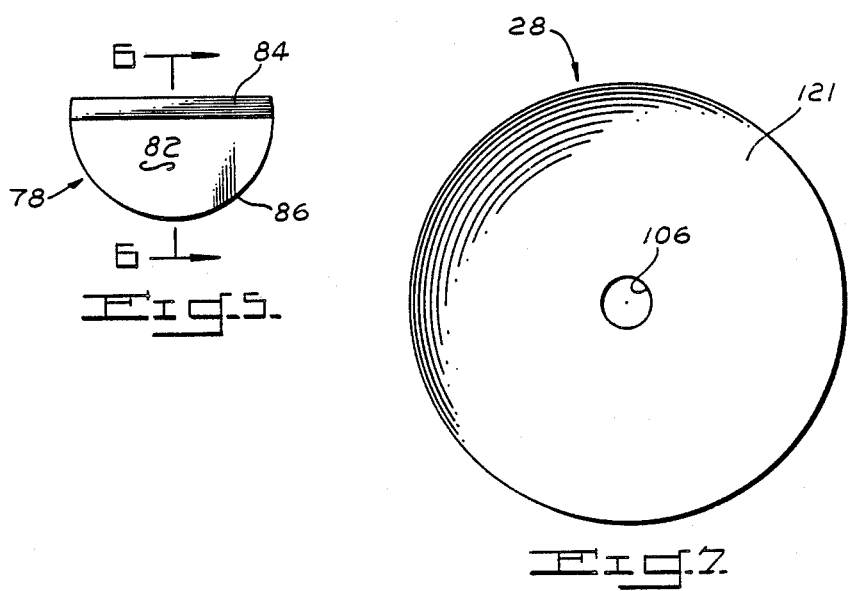

VACUUM DISTILLATION SYSTEM

BACKGROUND OF THE INVENTION

This invention relates to liquid purification systems and, more particularly, to an improved vacuum distillation system for inexpensive desalination of seawater or sterilization of any contaminated liquid, such as sewage or chemical waste.

One of the major problems facing future generations is polluted water. Increasing world population and rapid industrial growth combine to cause tremendous contamination problems in the world's rivers, lakes and oceans with an infinite variety of chemical and biological substances. This water must be cleansed before major health problems occur "down the line" or the fish and animal life, as we know it, are threatened.

Another related problem is the lack of potable water, both now and in the future. On land, many areas are arrid or suffer periodic droughts; and at sea, large ships (such as oil tankers) must often carry a huge supply of water for both boiler use and drinking. Clearly, purifications systems would be useful if they could quickly and economically provide abundant amounts of fresh water from seawater or sewage.

Since seawater is almost inexhaustable, desalination systems have been tried for years. However, they have not found widespread acceptance in industry or public use because they are generally bulky and not cost effective. Further, unless they are huge, they normally produce only small quantities of water daily.

One tried type is the vacuum distillation concept described in U.S. Pat. No. 3,558,431 to Foley et al. and U.S. Pat. No. 3,234,109 to Lustenader. Both patented systems utilize the same "vacuum distillation" concept and employ similar basic structure. A vertically extending evaporation or separation chamber is connected in fluid communication with a vertical condensing or product chamber; the chambers are placed under a low pressure by a vacuum pump in the product chamber; and a refrigeration unit is employed with its hot condensing coil located in the system's separation chamber and its cold evaporator coil located inside the product chamber. Seawater can be introduced into the evaporator chamber, where it will boil and evaporate at a low temperature (received from the hot condensing coil of the refrigerator) due to a partial vacuum created by the pump. From there, the vapor rises and hits a plurality of baffles. Particulate hits the baffles and falls back into the reaction chamber, while the rest of the "distillate" vapor flows into the product chamber where it is condensed by the cold coil of the refrigerator as purified liquid.

Theoretically, a vacuum distillation system should be able to both desalinate seawater and purify any contaminated liquid, such as water from a polluted river. However, while commercial versions can achieve this to a limited degree, they have significant commercial drawbacks. For example, prior systems are bulky because their vertical separation and product chambers must be at least 20-40 feet high to avoid undesired splash of the boiling contaminated liquid through a system's baffles and to minimize re-evaporation of the purified liquid collected in the product chamber.

Accordingly, it is the principal object of the present invention to provide an improved vacuum distillation system that overcomes the drawbacks of the prior art.

It is therefore a main object to provide a compact vacuum distillation system that can inexpensively purify any contaminated liquid, including seawater, sewage and chemical waste.

It is another object to provide a purification system that readily separates particulates from the purified liquid for recovery or disposal.

It is another object to provide a vacuum distillation system that is inexpensive to design, yet extremely safe and durable to use.

SUMMARY OF THE INVENTION

As with the aforementioned Foley and Lustenader systems, the present vacuum distillation system includes separation and product chambers; a vacuum pump to place the system under a low pressure; and a refrigeration unit to help evaporate the contaminated liquid inside the separation chamber and to condense the resulting distillate vapor inside the product chamber to produce "pure" liquid. However, unlike the prior art, this system also includes a unique set of vertically stacked fan-shaped baffles in the top of the separation chamber, wherein the baffles have downturned lips that close the gaps between successive baffles and grab particulates as they attempt to flow from the separation chamber into the product chamber; and a funnel that permits condensed water to drip into a collection area under the refrigeration coil in the product chamber, but prevents the collected water from re-evaporating.

Because of the unique configuration and closeness of the baffles, very little particulate escapes beyond them. Consequently, the separation chamber can be much smaller than those found in prior commercial vacuum distillation systems. Also, the chamber can be operated at a much lower pressure than previously anticipated (10-14 torr). This permits larger amounts of contaminated liquid to be vaporized quickly and completely by a combination of the ambient temperature and the heat of the refrigeration coil.

As for the funnel, it effectively shields the stored condensed or "product" water from the low-pressurized reaction chamber directly above it. Since the only portion of the stored water that is exposed to the low-pressure zone is the water inside the funnel's drip pipe, the exposed surface area of the collected water is greatly reduced. This has a twofold effect: it nearly eliminates any loss of collected water from re-evaporating and it thereby prevents that otherwise re-evaporating water from hindering any future condensation on the bottom of the refrigeration coil inside the product chamber.

The above and other objects and advantages of this invention will become more readily apparent when the following description is read in conjunction with the accompanying drawings.

BRIEF DESCRIPTION OF THE DRAWINGS

FIG. 2 is a fragmentary elevational view of an improved vacuum distillation system constructed in accordance with the present invention;

FIG. 3 is a top plan view of a fan-shaped baffle shown in FIG. 2;

FIG. 4 is an end view of one of the "fan" blades taken along line 4—4 of FIG. 3;

FIG. 5 is an elevational view of a vertical baffle shown in FIG. 2;

FIG. 6 is a cross-sectional view of the FIG. 5 baffle taken along line 6—6; and

FIG. 7 is a top plan view of a funnel shown in FIG. 2.

DETAILED DESCRIPTION OF THE PREFERRED EMBODIMENT

Figure 1:
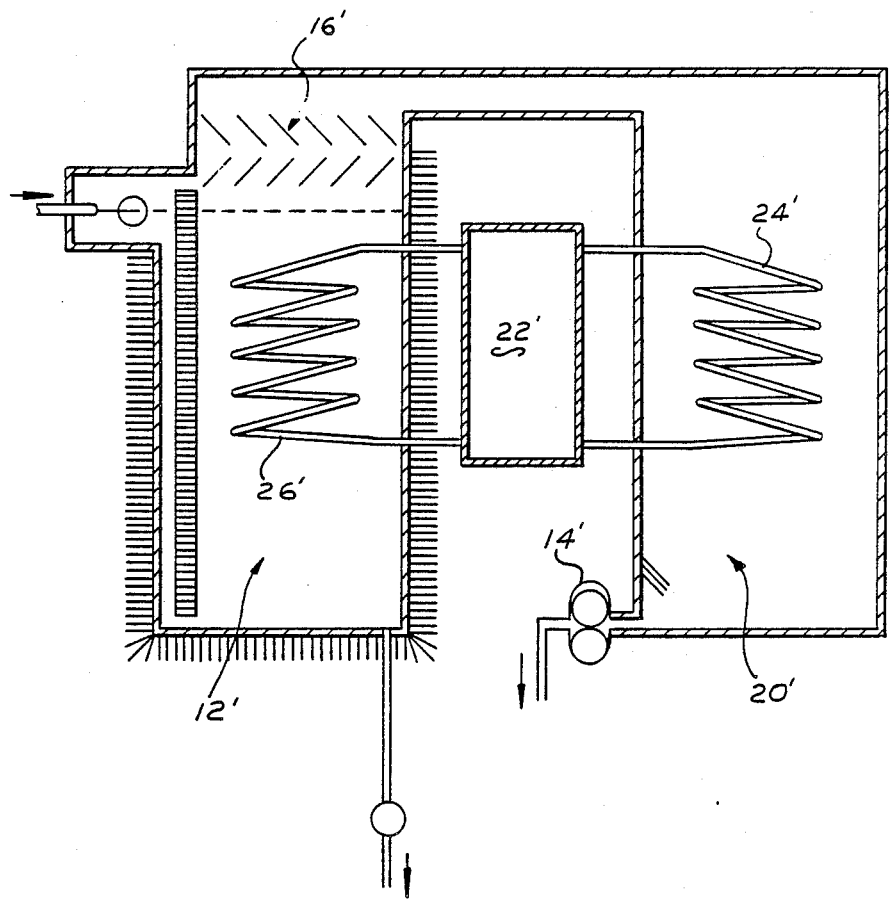
FIG. 1 is a schematic of the "PRIOR ART" disclosed in U.S. Pat. No. 3,558,436 to Foley.

An improved vacuum distillation system for purifying contaminated liquids is shown in FIGS. 2–7 and generally designated by the reference numeral 10. It is commercially marketed under the trademark PURETAN TM by Roncell Inc. of Westfield, MA.

In the preferred embodiment, the PURETAN TM system includes a vertical separation chamber 12 in which contaminated water is boiled and evaporated at a low temperature due to a low pressure created by a vacuum pump 14; a stack of fan-shaped baffles 16 in the top of the separation chamber that provide a tortuous path for the "distillate" vapor, wherein the baffles have downturned lips 18, 19 that trap particulates to prevent them from escaping the separation chamber; a product chamber 20 to which the vapor flows to be condensed; a refrigeration unit 22 having its "cold" coil 24 located inside the product chamber 20 to condense the vapor into pure liquid, wherein the same unit has its "hot" coil 26 located inside the separation chamber to assist the boiling of the contaminated fluid; and a funnel 28 underlying the condensation point of the water, wherein the funnel permits the condensed water to drip below it and acts as a shield to prevent re-evaporation of the collected water.

FIG. 1 shows a "PRIOR ART" vacuum distillation system. It is a reproduction of FIG. 4 from U.S. Pat. No. 3,558,431 to Foley et al. As previously described in this application's "Background of the Invention" section, that patent shows that the following elements of the present invention are basically standard: an evaporation or separation chamber; overlying baffles in general; a condensing or product chamber; an attached vacuum pump; and an associated refrigeration unit. To aid in their comparison with the present invention, those elements have been assigned the same numbers as their counterparts found in FIG. 2, but with primes after them.

Applicants have constructed a prototype of the PURETAN TM invention. Its dimensions and particulars will be continually referred to in the present application to assist in ascertaining the nuances between the patented device of Foley and the present invention.

In the present invention, the separation chamber is formed by a right cylinder 29 made of polyvinyl chloride ("PVC"). The cylinder is approximately four feet high and has an outer diameter of approximately eighteen inches. It is capped off by top and bottom end caps 30, 32 that are fixedly attached by any suitable means, such as wing nuts (not shown).

A finned copper coil 26 is located in the bottom of chamber 12. It is the condensing coil or "hot end" of any suitable refrigeration unit 22, such as Model No. CRN1-0500PFV manufactured by Melchior/Armstrong Dessau Inc. of Ridgefield, N.J.

Two PVC pipes 36, 38 interconnect coil 26 to refrigeration unit 22. The PVC inlet 36, providing heat, enters above the coil and is connected to its bottom, while the "colder" discharge pipe 38 from the coil exits near the coil's top.

Above the coil is an inlet pipe 40 for supplying contaminated liquid (not shown) to the separation chamber 12. When liquid is supplied, it is normally located between three level floats 42, 44, 46 that automatically control the intake of the contaminated liquid through conventional electronic circuitry. Since that circuitry forms no part of the present invention, it has been omitted for convenience.

Above the intake line 40 is one of the primary unique features of the present invention—a set of seven identical fan-shaped baffles 16 housed inside a modular plastic cylinder 47. The baffles are horizontally oriented and stacked with successive baffles being spaced slightly apart.

In the prototype, baffles 16 are made of non-corrosive Plexiglass. Each has a central hub 48 with three identical fan blades 50, 52, 54 that form part of a circle. The blades have flat main bodies or top portions 56, 58, 60 (see FIG. 3) that are identical in size and shape to the 60° gaps between them.

Each fan blade has downturned lips 18, 19 at its two sides. These lips are angularly offset from the flat blade tops by approximately 45° (SEE FIG. 4). They are slightly recessed from the blades' flat chordal edges 66, as shown at 68. This provides flaps for inserting the marginal edges into corresponding chordal slits in a modular plastic cylinder 47.

When mounted in the cylinder 47, each successive baffle is displaced or rotated 60° from the baffle below it. Consequently, the flat portions (56, 58, 60) of each baffle cover the gaps of the baffle below it. Further, the orientation of alternate baffles is identical.

The main bodies or flat portions (56, 58, 60) of each baffle are approximately three inches above the flat portions of the next baffle below them. However, the lips 18, 19 close the effective gaps between the tips of the lips and those next flat portions to about two inches.

When the entire PURETAN TM system is assembled, cylinder 47 sits atop a resting ring 72. This ring is fixedly attached to the PVC cylinder 29 by any suitable means, such as welding.

A basically horizontal conduit 74 interconnects the tops of separation chamber 12 and product chamber 20. It is made of PVC and has an outer diameter of approximately eight inches.

As viewed from left to right in FIG. 2, conduit 74 is inclined slightly upward. It has a pair of vertical baffles 76, 78 near its midpoint. These baffles are housed in another modular plastic cylinder 80.

Referring to FIGS. 5 and 6, each vertical baffle has a main body 82 that is flat and semi-circular. At its "diameter" is a downturned lip 84 that is angularly offset by approximately 45°.

The marginal edges (e.g., 86) of the vertical baffles 76, 78 are inserted into corresponding slits in cylinder 80. These slits are situated so that the baffles (when assembled) will oppose one another. Baffle 76 hangs from the top of the cylinder, while baffle 78 extends upwardly; and the lips of these baffles face one another.

Though not shown, the modular cylinder 80 is removably held inside conduit 74 by any suitable means, such as a resting ring. Like the resting ring 72, this permits module 80 to be easily replaced if necessary.

Horizontal conduit 74 lets vapor into the upper part of product chamber 20. Like separation chamber 12, the product chamber is a right cylinder made of PVC. It is approximately three feet high and has an outer diameter of eighteen inches. Also, it is topped by a removable end cap 88 that is similar to the separation chamber's cap 30.

Immediately below the entrance point of conduit 74 is a finned helical or spiral coil 24. It is the evaporation coil or "cold end" of the same refrigeration unit 22 that services separation chamber 12. Two PVC pipes 92, 94 interconnect this coil to refrigeration unit 22. The PVC inlet 92, providing extreme cold, enters below the coil and is connected to its top, while the "warmer" discharge pipe 94 from the coil exits near the coil's bottom.

Coil 24 is made of copper and shaped like an upside down beehive. Note that each "rung" or coil loop is purposely smaller than the inner diameter of the rung above it. This prevents condensate from dripping off an upper loop onto a loop below it and hindering that lower loop's own ability to condensate.

As best shown in FIG. 2, coil 24 rests atop an annular ring or shelf 96, while the bottom of the coil rests atop coil plate 98. Both the shelf 96 and plate 98 are fixed to the inside of product chamber 20 and permit easy removal of the coil if necessary.

Below the coil is an inlet line 100 that interconnects the inside of chamber 20 to the vacuum pump 102. Like the other piping, this line is also made of PVC. Though the vacuum pump could be any suitable type, such as Model No. RA0040 manufactured by Busch Incorporated of Virginia Beach, Va.

Moving down the chamber 20, the funnel 28 (for collecting condensed water off coil 24) sits atop a fixed ring 104. The funnel has a central hole 106 (see FIG. 7) with a drip pipe 108 extending below it (FIG. 2). The pipe leads into the collection area 110 where the condensed (product) liquid is stored.

Like separation chamber 12, this storage area 110 contains three level floats 112, 114, 116. They work off conventional circuitry (not shown) to permit automatic withdrawal of collected liquid to an underlying dump chamber 118. Since that circuitry forms no part of the present invention, it has been omitted for convenience.

DESCRIPTION OF OPERATION

In operation, the PURETAN TM liquid purification system operates on the vacuum distillation principle.

First, the vacuum pump 14 is turned on to reduce the pressure inside the separation and product chambers 12, 20 to operating pressure of 10-14 torr by removing air from the system. Contaminated liquid (e.g., impure water) is then added to the separation chamber by suction or assisted along by pumps (not shown). Liquid will flow into the separation chamber until the level reaches the mid-float 44, at which time the inlet valve (not shown) will be closed by conventional circuitry. As the water is processed, the level will fall until the low-level float 42 is reached, whereupon the inlet valve is again opened and the level in the separation chamber raised. If the low-level float 42 or the inlet valve do not actuate properly, the emergency high-level float 46 can be actuated and cause either alarm or shutdown as appropriate.

Because the operating pressure of the system is only 10-14 torr, water boils at a much lower temperature, to-wit 52°-62° F. The refrigeration unit's hot coil 26 assures that the temperature inside separation chamber 12 will be sufficient to cause complete boiling of the contaminated water 120 shown in FIG. 2.

The boiling water creates water vapor, and as a gas, this vapor will move toward the low pressure part of the system (product chamber 20) in an attempt to equalize the pressure. The vapor from the separation chamber must make its way through the unique set of horizontal fan-shaped baffles 16 in the separation chamber and through the vertical baffles 76, 78 in the connecting pipe 74. Because of the shape of these baffles, a tortuous path is provided in which any particulate is blocked and prevented from flowing onward, with the rest of the vapor, into product chamber 20.

When the warm vapor passes into product chamber 20, it hits the refrigerator's cold coil 24 located inside that chamber. The vapor then transfers heat to the cold (approximately 45° F.) refrigerant liquid in the coil 24, which condenses the water vapor back to a liquid while vaporizing the freon refrigerant. The gaseous freon is further heated by compression due to the refrigerator's compressor and is then passed to the "hot" heat-exchanger coil 26 in the separation chamber. There, the heat is transferred to the contaminated liquid and the freon is looped back through the refrigerator coil for subsequent expansion and recycling to the cold coil 24 inside product chamber 20.

The boiling of the impure water in separation chamber 12 is very violent. Consequently, liquid is being thrown all over the chamber and against the horizontal baffles 16. These baffles insure that only pure vapor gets to the product chamber for condensation into product water. Water that hits the horizontal baffles 16 harmlessly falls back to the bottom of the separation chamber where it may be reboiled. Also, the baffles' downturned lips 18, 19 basically trap any particulate that tries to sneak by the baffles. Similarly, the vertical baffles 76, 78 and the inclination of horizontal conduit 74 combine to block any leftover particulate from making its way to the product chamber, where it would contaminate any condensed or collected water.

As the vapor condenses into water inside product chamber 20, the drippings fall from cold coil 24 onto the funnel 28. Since the funnel's conical top 121 is sloped and leads into drip pipe 108, the pipe guides the drippings into the underlying collection area 110; and it extends into the bottom of the pool (see FIG. 2).

Once the water is collected, the funnel doubles as a shield to minimize the surface area of stored water that is exposed to the low-pressure zone above the funnel. This shielding prevents re-evaporation of the water and prevents that otherwise resulting vapor from hindering future condensation on coil 24.

The only collected water exposed to the low-pressure zone is the water inside drip pipe 108. That water is cooled by the remaining water inside the collection area 110, thus preventing reboiling even at the reduced pressure. As for that remaining water, it is sealed or shielded from the separation chamber by the underside of the funnel's sloped top 121 and the outside of the pipe. Any reboiling of it would be encased within the collection chamber and no evaporation could escape.

As the pure water is collected, its height raises inside collection area 110. When the top of the water hits mid-float 114, conventional circuitry can be used to close inlet pipe 40 to shut off the flow of incoming contaminated liquid. Also, the circuitry would simultaneously open a valve (not shown) to allow the collected water to flow by a gravity (or pump assist) to the underlying product dump chamber or reservoir 118. When the collected water falls and goes below the level of bottom float 116, the dump valve could be automatically closed and the inlet pipe 40 reopened. Note that the collection chamber also includes an emergency top float 112 for shutting down the system or triggering an alarm when the collected water becomes too high.

Applicants believe that the PURETAN ™ system has several unique features that distinguish it from the patented Foley system and other commercial versions. Among these unique features are the baffles 16 with lips 18, 19; the funnel 28; the beehive coil 24; and the inlet pipes 36, 92 that lead to coils 24, 26.

Although some baffles were tried originally by Applicants, as soon as the fan-shaped baffles 16 with lips were employed, the purity of water produced by the system increased dramatically. Further, because the baffles trapped particulates in such an increased manner, the height of the separation chamber 12 was able to be reduced significantly from prior commercial versions.

Originally, Applicants did not employ a funnel shield. Yet, as soon as the funnel 28 was used, the output of the system increased dramatically. The result was a more compact unit that was able to produce more gallons daily than other commercial systems.

As for the vertical baffles 76, 78 and tilted conduit 74, they too increased the purity when initially tried, though only slightly. Similarly, the location of the freon inlet pipes 36, 92 also improved production only slightly. Nonetheless, each of these extra two changes helped increase the system's efficiency.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A liquid purification system comprising:
   a. a vertical separation chamber in which contaminated liquid can be introduced for boiling and evaporation;
   b. a stack of horizontal fan-shaped baffles in the top of the separation chamber to provide a tortuous path of the vapor, wherein the baffles are spaced apart and have downturned lips that trap particulates to prevent them from escaping the separation chamber;
   c. a vertical product chamber connected in fluid communication with the separation chamber, whereby the distillate vapor can flow from the separation chamber to the product chamber;
   d. a vacuum pump connected to the product chamber, wherein the pump is adapted to place the separation and product chambers under a near vacuum to boil the contaminated liquid at a low temperature inside the separation chamber and thereafter suck the vapor through the baffles into the product chamber;
   e. a refrigeration unit having a cold coil located inside the product chamber to condense the vapor and a hot coil located inside the separation chamber to help boil the contaminated liquid; and
   f. a funnel located inside the product chamber below the refrigeration unit's cold coil, wherein the funnel has an unperforated sloped top that covers a collection area below it and a drip pipe that extends downwardly into that collection area with the collection area surrounding the pipe, whereby the funnel permits liquid to drip from the cold coil into the collection area and thereafter shields the collected liquid in that storage area from a lower pressurized zone above the funnel to prevent re-evaporation.

2. The purification system of claim 1 wherein each fan-shaped baffle has a central hub with three identical fan blades that form part of a circle and are equally spaced apart by approximately 60°, said blades having flat top portions that are identical in size and shape to the 60° gaps between successive blades, wherein each blade has a chordal edge and two sides with downturned lips located at each of those sides.

3. The purification system of claim 2 wherein each successive baffle is displaced 60° in a horizontal plane from the baffle below it, whereby the fan blades of each baffle cover the gaps of the baffle below it and the orientation of alternate baffles is identical.

4. The purification system of claim 1 wherein a horizontal conduit interconnects the vertical separation and product chambers and said conduit has a pair of vertical spaced apart baffles with angularly offset lips that oppose one another to trap particulate and to prevent its flow into the product chamber.

5. A liquid purification system comprising:
   a. a vertical separation chamber in which contaminated liquid can be introduced for boiling and evaporation;
   b. a vertical product chamber connected in fluid communication with the separation chamber, whereby the distillate vapor can flow from the separation chamber to the product chamber;
   c. a vacuum pump connected to the product chamber, wherein the pump is adapted to place the separation and product chambers under a near vacuum to boil the contaminated liquid at a low temperature inside the separation chamber and thereafter suck the distillate vapor into the product chamber;
   d. a refrigeration unit having a cold coil located inside the product chamber to condense the vapor and a hot coil located inside the separation chamber to help boil the contaminated liquid; and
   e. a funnel located inside the product chamber below the condensing coil with a sloped top that covers a collection area below it and a drip pipe that extends downwardly into that collection area with the collection area surrounding the pipe, whereby the funnel permits liquid to drip from the cold coil into the collection area and thereafter shields the collected liquid in that area from a lower pressure zone above the funnel to prevent that collected water from re-evaporating.

6. In a vacuum distillation system of the type having a vertical chamber in which contaminated liquid is boiled and evaporated at a low temperatue due to a low pressure created by a vacuum pump, baffles in the top of the separation chamber that provide a tortuous path for the distillate vapor, a product chamber to which the vapor flows to be condensed, and a refrigeration unit having its cold coil located inside the product chamber to condense the vapor into purified liquid, wherein the same unit has its hot coil located inside the separation chamber to help boil the contaminated liquid, the improvement comprising a funnel below the cold coil to catch condensate dripping from it, wherein the funnel has an unperforated conical top that covers a collection chamber below it and a drip pipe that extends downwardly into that chamber with the chamber surrounding the pipe, whereby the funnel guides the purified liquid into that collection area and also acts as a shield to prevent re-evaporation of the collected liquid.

7. A liquid purification system comprising:
a. a vertical separation chamber in which contaminated liquid can be introduced for boiling and evaporation;
b. a stack of horizontal fan-shaped baffles that are vertically spaced apart in the top of the separation chamber to provide a tortuous path for the distillate vapor, wherein:
  i. each baffle has a central hub with three identical fan blades that form part of a circle and are equally spaced apart by approximately 60°, said blades having flat main portions that are identical in size and shape to the 60° gaps between them, each main portion has a chordal edge and two straight sides with downturned lips located at each of those sides;
  ii. each successive baffle is displaced 60° in a horizontal plane from the baffle below it, whereby the fan blades of each baffle cover the gaps of the baffle below it and the orientation of alternate baffles is identical; and
  iii. wherein the baffles are spaced sufficiently close to one another for their lips to trap particulates and prevent them from escaping the separation chamber;
c. a vertical product chamber connected in fluid communication with the separation chamber by an inclined, basically horizontal conduit, whereby the distillate vapor can flow from the separation chamber to the product chamber;
d. a vacuum pump connected to the product chamber, wherein the pump is adapted to place the separation and product chambers under a near vacuum to boil the contaminated liquid at a low temperature inside the separation chamber and thereafter suck the distillate vapor through the baffles into the product chamber;
e. a refrigeration unit having a cold coil located inside the product chamber to condense the vapor and a hot coil located inside the separation chamber to help boil the contaminated liquid; and
f. a funnel located inside the product chamber below the refrigeration unit's cold condensing coil, wherein the funnel has a sloped top that covers a collection area below it and a drip pipe that extends downwardly into that collection area with the collection area surrounding the pipe, whereby the funnel permits liquid to drip from the cold coil into the collection area and thereafter shields the collected liquid in that area from a lower pressurized zone above the funnel to prevent re-evaporation.

8. A liquid purification system comprising:
a. a vertical separation chamber in which contaminated liquid can be introduced for boiling and evaporation;
b. a stack of horizontal fan-shaped baffles in the top of the separation chamber to provide a tortuous path of the distillate vapor, wherein each baffle has a central hub with three identical fan blades that form part of a circle and are equally spaced apart by approximately 60°, said blades having flat top portions that are identical in size and shape to the 60° gaps between successive blades, wherein each blade has a chordal edge and two sides with downturned lips located at each of those sides and the baffles are spaced sufficiently close to one another for their lips to trap particulates and prevent them from escaping the separation chamber;
c. a vertical product chamber connected in fluid communication with the separation chamber, whereby the distillate vapor can flow from the separation chamber to the product chamber;
d. a vacuum pump connected to the product chamber, wherein the pump is adapted to place the separation and product chambers under a near vacuum to boil the contaminated liquid at a low temperature inside the separation chamber and thereafter suck the distillate vapor through the baffles into the product chamber; and
e. a refrigeration unit having a cold coil located inside the product chamber to condense the vapor and a hot coil located inside the separation chamber to help boil the contaminated liquid.

* * * * *